ary—William R. Wright, Jr.

United States Patent [19]
Lovingham

[11] 3,740,945
[45] June 26, 1973

[54] INJECTOR FOR ROCKET MOTORS USING HIGH VISCOSITY FUEL

[75] Inventor: Joseph J. Lovingham, Madison, N.J.

[73] Assignee: Thiokol Chemical Corporation, Bristol, Pa.

[22] Filed: Feb. 27, 1969

[21] Appl. No.: 802,833

[52] U.S. Cl. ................. 60/204, 60/258, 60/259
[51] Int. Cl. ............................................ B63h 11/00
[58] Field of Search ............. 60/204, 39.06, 39.71, 60/39.74, 252, 258, 219, 39.48

[56] References Cited
UNITED STATES PATENTS

| | | | |
|---|---|---|---|
| 1,757,855 | 5/1930 | Chilowsky | 60/39.71 |
| 2,558,483 | 6/1951 | Goddard | 60/258 |
| 2,916,367 | 12/1959 | Stokes | 60/39.71 |
| 3,092,959 | 6/1963 | Scurlock et al. | 60/219 |
| 3,349,562 | 10/1967 | Williams et al. | 60/252 |
| 3,388,554 | 6/1968 | Hodgson | 60/219 |

Primary Examiner—Samuel Feinberg
Attorney—William R. Wright, Jr.

[57] ABSTRACT

An improved injector for a rocket motor using high viscosity fuel is presented which assures smooth flow of the fuel and very little pressure drop despite the extreme viscosity. A high velocity gas is made to flow over a Coanda shaped body located within the head end of the rocket motor and the fuel is thereby drawn into the combustion chamber.

6 Claims, 1 Drawing Figure

PATENTED JUN 26 1973
3,740,945
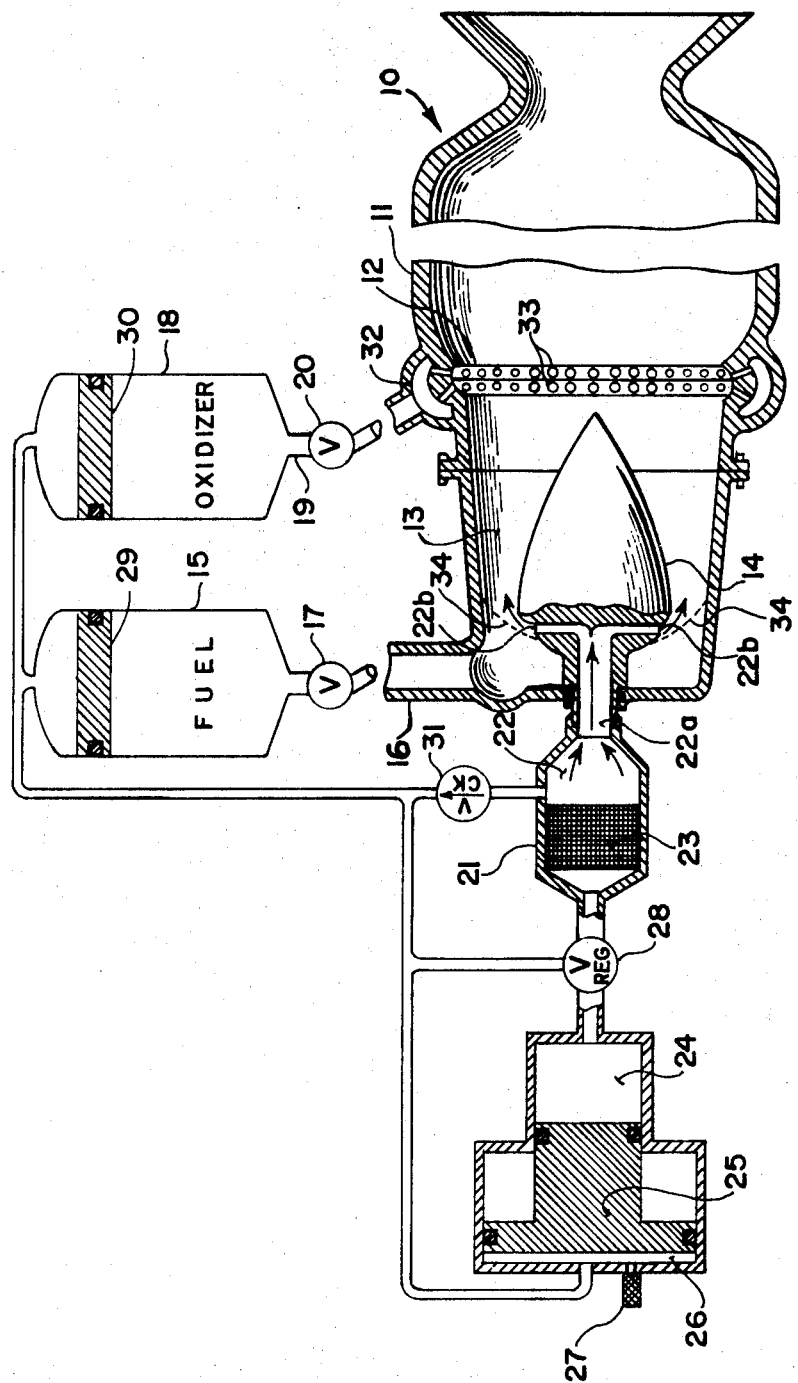
Joseph J. Lovingham
INVENTOR.
BY William R. Wright Jr.
HIS AGENT

INJECTOR FOR ROCKET MOTORS USING HIGH VISCOSITY FUEL

BACKGROUND OF THE INVENTION

The present invention relates to rocket motors which utilize a fuel of extremely high viscosity, as compared with ordinary rocket fuels, for the purposes of achieving higher performance. It relates, more particularly, to an improved injector mechanism which essentially negates the high pressure drop normally required to inject the thick fuels and thus eliminates the weight penalty necessarily induced in the structure of the tankage and fuel system to support higher pressures than are normally encountered when ordinary low viscosity propellants are used.

The use of metal loaded, slurried or gelled fuels in rocket engines offers potential for performance increases. Unfortunately, however, these fuels have viscosity characteristics which ordinarily require the expenditure of large amounts of energy for expulsion and injection, particularly at low temperatures where their viscosity is particularly great. In the present invention, the thick propellant is allowed to flow into an injector chamber in an essentially quiescent condition at extremely low velocity and is fed into a high velocity flowing gas stream through a screen or perforated sheet at the extremely low velocity and at practically zero pressure drop, the fuel being drawn into the high velocity gas stream where the gas stream is made to curve downstream in a right angle turn by deflection of the stream by the use of the effect previously discovered by Henri Coanda. The Coanda effect is that which is described in the patent to Henri Coanda, U.S. Pat. 2,052,869 issued Sept. 1, 1936 particularly where he says (column 1, lines 1–9):

"It is an observed fact that when a stream or sheet of fluid issues through a suitable orifice, into another fluid, it will carry along with it a portion of the surrounding fluid, if its velocity is sufficient. In particular, if a sheet of gas at high velocity issues into an atmosphere of another gas of any kind, this will produce, at the point of discharge of the said sheet of gas, a suction effect, thus drawing forward the adjacent gas."

Also, at column 1, lines 10–15:

"If, at the outlet of the fluid stream or sheet, there is set up an unbalancing effect on the flow of the surrounding fluid induced by said stream, the latter will move towards the side on which the flow of the surrounding fluid has been made more difficult."

This principle has been applied in a novel manner in the present invention in order to provide an effective method of drawing the viscous fuel into the combustion chamber of the thrust chamber without the necessity for any but a very small and almost negligible additional pressure drop with respect to the fuel itself.

It is, therefore, an object of the present invention to provide an improved injector system for a bi-propellant rocket motor in which the fuel is of a high viscosity type but the oxidizer is of ordinary viscosity.

It is also an object of the present invention to provide an injector for injecting high viscosity fuel into a rocket thrust chamber wherein the high viscosity fuel is effectively dispersed before it is mixed with an oxidizer and burned.

It is also an object of the present invention to provide an injector of the foregoing type in which the Coanda suction principle is applied in a new combination in a rocket motor to aid in efficient injection of very high viscosity fuels.

It is also an object of the present invention to provide a method of injecting viscous fuel into a rocket motor without the need for unusually high injection pressure.

In the drawings:

The single FIGURE is a semi-schematic cross sectional view of a typical rocket motor utilizing very high viscosity fuel in the novel manner of the present invention.

In a preferred embodiment of the invention with reference to the drawing, the rocket motor thrust chamber 10 is intended to have a combustion chamber 11, an oxidizer injector 12, a fuel entrance chamber 13 and a "Coanda" body 14 located within chamber 13. A main fuel tank 15 is communicably connected by conduit 16 through shut-off valve 17 to fuel entrance chamber 13 near its head end (its left end in the drawing) and an oxidizer tank 18 is communicably connected by conduit 19 through shut-off valve 20 to oxidizer manifold 32 and orifices 33 of injector 12. A gas generator 21 comprising a chamber 22 and a catalyst bed 23, such as a silver screen or other suitable type of catalyst, is interposed between the head end of thrust chamber 11 and is supplied with a catalytically decomposable liquid such as hydrogen peroxide from chamber 24. This supply is accomplished by the forcing out of the liquid from chamber 24 by movement of piston 25 under urging of gas pressure developed in chamber 26 upon the firng of squib igniter 27 and a regulator valve 28 is included between chamber 25 and the gas generator 21 to maintain a steady pressure and to ensure a constant flow of liquid to the generator 21.

In operation, squib igniter 27 is fired and supplies gases to chamber 26 which then exert pressure upon piston 25 moving it to the right in the drawing, this action causing the smaller diameter end of piston 25 to create pressure upon the liquid monopropellant contained in chamber 24. When this pressure reaches a desired operating value, regulator valve 28 opens automatically and allows the monopropellant to flow into gas generator 21 where it is decomposed into gases. These gases then pass into chamber 22 and through passage 22a into the Coanda body in the direction shown by the arrows and then pass out of the Coanda body at high velocity thru narrow annular passage or gas inlet 22b into chamber 13. While the foregoing is taking place, pressurized gases from chamber 26 are carried by suitable conduits to the fuel and oxidizer tanks 15, 18 pressurizing them and moving their pistons 29, 30 downward to pressurize the propellants contained therein to a normal propellant pressure. Gas from generator 21 is supplied through check valve 31 and suitable conduits to tanks 15, 18 to supplement that supplied by squib 27.

When the pressure in the propellant tanks 15, 18 reaches the desired operating pressure, propellant valves 17, 20 are opened to permit the flow of propellants to the rocket engine. The oxidizer from tank 18 then flows into manifold 32 and from there it enters the thrust chamber through orifices 33 in the chamber wall. Meanwhile, viscous fuel from tank 15 flows through conduit 16 into chamber 13 and collects upstream of perforated plate 34 and starts to "ooze" through it. At this point, the high velocity gas emerging from annular gas inlet 22b, and which is caused to curve to the right in the drawing by the Coanda effect induced by the higher resistance effect of the downstream (with respect to the flow of fuel) raised shoulder of gas inlet 22b as compared to its opposite (or upstream with respect to the flow of fuel) shoulder I entrains the viscous fuel pulling it through the perforations in the plate 34 in fine, small diameter strings which then break up into small droplets as they are carried along by the rapidly flowing gas. By the time the gas and entrained fuel reach the oxidizer, the fuel is well dispersed and ready to mix with the oxidizer injected through injector 12. Upon contact, the fuel and oxidizer become ignited because of their hypergolicity and burn in the thrust chamber 11 in the usual manner.

Among the various viscous fuels which can be utilized in the present invention are those containing, in addition to a gelling agent, approximately 50 per cent by weight of powdered boron in an alcohol carrier liquid, mixed hydrazine liquids containing about 50 percent by weight of aluminum powder and tremethylhexane liquid containing about 73 percent by weight metal powder. All of these can be expected to follow similar behavorial patterns insofar as the present invention is concerned and all of these fuels are highly viscous in nature and are hypergolic with the liquid oxidizer which can be, for example, liquid oxygen.

From the foregoing, it will be seen that the need for higher injection pressures than are normally used for propellants of ordinary viscosity such as neat hydrazine fuels is eliminated and no appreciable weight penalty is incurred insofar as higher strength fuel tankage and fuel system are concerned simply because the high viscosity fuel is employed.

I claim:

1. An inector for a rocket thrust chamber using viscous fuel as a propellant comprising a fuel inlet communicating with a mixing chamber, gas inlet means for introducng gas at high velocity into said chamber through a gas inlet located downstream of the fuel inlet, apertured means extended across said chamber downstream of said fuel inlet and upstream of and adjacent to said gas inlet, said gas inlet having a higher resistance side and a lower resistance side with the higher resistance side downstream of said gas inlet with respect to the fuel flow, and pressurized means producing flow of viscous fuel into the mixing chamber and onto the apertured means in a direction which intersects the direction of the flow of gas from the gas inlet, whereby the viscous fuel is drawn through the apertured means and is entrained in the high velocity gas as the gas follows the higher resistance side of its gas inlet due to the Coanda effect.

2. The invention set forth in claim 1 with the apertured means comprising a screen.

3. The invention set forth in claim 1 with the apertured means comprising a perforated plate.

4. The invention set forth in claim 1 with the higher resistance side of the gas inlet comprising a shoulder on the gas inlet on the downstream side raised with respect to the opposite side of the gas inlet.

5. The invention set forth in claim 1 with the raised shoulder being rounded.

6. The method of injecting viscous propellant into a rocket motor combustion chamber consisting of the steps of passing gas at high velocity into a mixing chamber upstream of the combustion chamber, causing the gas to change its direction by Coanda effect upon its entry into the mixing chamber, exposing viscous propellant to the gas flow where it changes direction to entrain it in the gas, subsequently mixing the mixed fuel and gas with oxidizer and causing the whole mixture to pass into the combustion chamber.

* * * * *